United States Patent [19]
Hoefer et al.
[11] Patent Number: 4,657,999
[45] Date of Patent: Apr. 14, 1987

[54] POLYMERIZATION EMULSIFIERS

[75] Inventors: Rainer Hoefer, Duesseldorf; Karl-Heinz Schmid, Mettmann; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 801,016

[22] Filed: Nov. 22, 1985

[30] Foreign Application Priority Data

Nov. 22, 1984 [DE] Fed. Rep. of Germany ....... 3442457

[51] Int. Cl.[4] ................ C08F 2/00
[52] U.S. Cl. ................ 526/200
[58] Field of Search ................ 526/200

[56] References Cited

U.S. PATENT DOCUMENTS 3,340,243 9/1967 Beer et al. ................ 260/92.8
3,839,318 10/1974 Mansfield ................ 260/210

FOREIGN PATENT DOCUMENTS 3404558 8/1985 Fed. Rep. of Germany .

*Primary Examiner*—Paul R. Michl
*Assistant Examiner*—Alex H. Walker
*Attorney, Agent, or Firm*—Ernest G. Szoke; Henry E. Millson, Jr.; Real J. Grandmaison

[57] ABSTRACT

The use of alkyl glycosides of $C_8$–$C_{22}$ alkanols and reducing sugars, in which one sugar chain containing on average from 1 to 10 sugar residues attached to one another by glycoside bonds is present for every alkyl group, as co-emulsifiers or emulsifiers in the emulsion polymerization of ethylenically unsaturated monomers.

12 Claims, No Drawings

POLYMERIZATION EMULSIFIERS

BACKGROUND OF THE INVENTION 1. Field of the Invention

This invention relates to the use of alkyl glycosides as emulsifiers in the polymerization of ethylenically unsaturated monomers. 2. Description of Related Art Alkyl glycosides have been known for some time. Their production is described, for example, in U.S. Pat. No. 3,839,318; according to which the starting materials used are glucose or oligosaccharides on the one hand and $C_8$–$C_{25}$ alcohols on the other hand. Alkyl glycosides have acquired commercial significance as surface-active agents, for example, in detergents. In addition, alkyl glycosides have also been proposed for various commercial applications. Thus, Applicants' earlier German Patent Application P No. 34 04 558.9 describes special aqueous lacquer resin dispersions in which alkyl glycosides are present as incorporable emulsifiers, i.e. emulsifiers which are co-crosslinked on stoving.

U.S. Pat. No. 3,340,243 describes a process for producing PVC by suspension polymerization in which the dispersant used consists of methyl glucoside dilaurate in addition to protective colloids. The methyl glucoside dilaurate is not an alkyl glycoside in the sense of the present invention.

Despite the numerous otherwise known compounds, alkyl glycosides have never been used in the field of emulsion polymerization. Hitherto, it has not been possible for those skilled in this art to draw firm conclusions from the chemical structure of a compound as to its suitability as a polymerization emulsifier. Accordingly, in view of the many requirements which polymer dispersions now have to satisfy, there is a continuing need for new polymerization emulsifiers. In this connection, the emulsifier used in the emulsion polymerization process has a crucial effect not only on the beginning and the subsequent course of the polymerization reaction, but also on the mechanical and chemical stability of the finished polymer emulsions (dispersions). Thus, such properties as, for example, frost stability and stability in storage depend crucially on the emulsifier.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide emulsifiers for emulsion polymerization which, on the one hand, show the favorable properties of alkyl glycosides, namely the fact that they can be produced from universally available, renewable natural raw materials and which, on the other hand, are at least equivalent in their technical properties to hitherto known nonionic emulsifiers, for example adducts of ethylene oxide with alkyl phenols.

Accordingly, the present invention relates to the use of alkyl glycosides of $C_8$–$C_{22}$ alkanols and reducing sugars, in which one sugar chain containing on average from 1 to 10 sugar residues attached to one another by glycoside bonds is present for every alkyl group, as co-emulsifiers or emulsifiers in the emulsion polymerization of ethylenically unsaturated monomers.

The alkyl glycosides used in accordance with the invention can be produced, for example, by the process according to the above-mentioned U.S. Pat. No. 3,839,318. In that process, sugars such as, for example, glucose or oligosaccharides and alcohols having the required chain length, for example $C_6$–$C_{18}$, are reacted at 80°to 130° C. in the presence of an acidic catalyst, such as sulfuric acid, the water of reaction being separated off by vacuum distillation or by azeotropic distillation, and any change in the glucose being largely avoided by monitoring the reaction temperature and the catalyst concentration.

Suitable polymerization emulsifiers are alkyl glycosides wherein the alkyl group emanates from a $C_8$–$C_{22}$ alcohol and the sugar residue from a reducing sugar. The alkyl groups can be linear or branched and can contain an odd or even number of carbon atoms and, if desired, one or more olefinic double bonds.

According to the present invention, it is preferred to use alkyl glycosides of the type derived from fatty alcohols. Preferred alkyl glycosides are alkyl glycosides of fatty alcohol mixtures having a chain length of $C_8$, $C_{10}$, $C_{12}$, $C_{14}$, $C_{16}$ or $C_{18}$, the $C_{16}$ or $C_{18}$ groups optionally containing from 1 to 3 ethylenically unsaturated double bonds.

Insofar the saccharide part of the alkyl glycosides is concerned, alkyl glycosides with a sugar chain containing on average from 1 to 10 sugar residues attached to one another by glycoside bonds are suitable. Although sugar residues of different reducing sugars can be used, glucose and maltose are preferred. The number of sugar residues is a statistical mean value on which the distribution typical of these products is based. Particularly suitable emulsifiers are alkyl glycosides containing on average from 1.5 to 5 sugar molecules per alkyl group and, more particularly, from 1.5 to 5 glucose molecules. Of these emulsifiers, alkyl glycosides having a C-chain length of from $C_8$ to $C_{14}$ are particularly preferred. Products such as these may be produced, for example, by reacting coconut oil fatty alcohol with glucose in accordance with Example 6 of the above-mentioned U.S. Pat. No. 3,839,318.

According to the present invention, alkyl glycosides can be used as sole emulsifiers (primary emulsifiers) in emulsion polymerization processes. In that case, they are used in a quantity of from 0.5 to 10% by weight and, more particularly, in a quantity of from 2 to 6% by weight, based on the dispersion as a whole.

However, it is preferred to use the alkyl glycosides of the invention together with known emulsifiers. Thus, alkyl glycosides of the invention can be combined with anionic, cationic or other nonionic emulsifiers. Suitable anionic emulsifiers are sulfocarboxylic acids, their alkyl esters, fatty alcohol (ether) sulfates, alkyl phenol (ether) sulfates, sulfosuccinic acid (semi)esters and/or soaps of natural or synthetic origin. Other suitable anionic emulsifiers are, for example, disproportionated resin soaps, water-soluble salts of branched chain monocarboxylic acids obtainable, for example by the so-called Guerbet reaction, alkyl benzene sulfonates, paraffin sulfonates, alkyl naphthalene sulfonates, water-soluble salts of sulfated oils, alkyl ether phosphates, alkyl phenol ether phosphates, aminoalkanol sulfonic acids and/or alkyl diphenyl ether sulfonates.

According to the invention, the present alkyl glycosides can also be used together with cationic emulsifiers, for example with fatty amine hydrochlorides or quaternary ammonium compounds. Other emulsifiers which can be combined with the alkyl glycosides are nonionic emulsifiers, for example ethoxylates of alkyl phenols, fatty acids and/or fatty alcohols. In addition, alkyl glycosides can also be used in conjunction with mixed-ionic compounds, i.e. long-chain betaines or sulfobetaines. Where the alkyl glycosides of the invention are combined with other emulsifiers, it is preferred to use these other emulsifiers in quantities of from 10 to 80% by weight and preferably in quantities of from 20 to 50% by weight, based on the alkyl glycoside. One particularly preferred combination consists of sulfofatty acid esters, sulfofatty acids and the alkyl glycosides used in accordance with the invention. In this case, the quantity of alkyl glycoside used amounts to between 0.1 and 10% by weight and preferably to between 0.5 to 6% by weight, based on monomer.

To solve particular problems associated with emulsion polymerization, it may even be advisable to use alkyl glycosides together with protective colloids. In that case, however, it is improtant to ensure that, mechanistically, emulsion polymerization does in fact take place, i.e. that the polymerization reaction takes place in micelles, forming latices having a smaller particle size than the starting dispersion. In this connection, reference is made to the general literature in this specialized field, for example to the book by F. Holscher entitled "Dispersionen synthetischer Hochpolymerer (Dispersions of Synthetic High Polymers)", Parts I and II, Springer-Verlag Berlin, Heidelberg, N.Y. 1969.

In a first embodiment of the invention, the alkyl glycosides can be used, preferably in combination with anionic emulsifiers, in the emulsion polymerization of olefins. Suitable olefins are, for example, styrene or other aromatic vinyl compounds, such as α-methyl styrene or isobutene. The emulsifiers can also be used in the emulsion polymerization of diolefins, for example in the production of rubber latices in the broadest sense, i.e. those based on butadiene, isoprene, chlorinated butadienes, chlorinated isoprenes or on copolymers of diolefins with styrene and/or acrylonitrile.

In another embodiment of the invention, the present alkyl glycosides can be used, preferably in conjunction with anionic emulsifiers, in the emulsion polymerization of esters and/or amides of acrylic and/or methacrylic acid. Thus, the compounds can be used in the polymerization of the methyl, ethyl, propyl, isopropyl, butyl, hexyl and/or 2-ethylhexyl esters of acrylic acid and/or methacrylic acid. The emulsifiers can also be used in the emulsion polymerization of n-alkylamides of acrylic and/or methacrylic acid.

In another embodiment of the invention, the present alkyl glycosides can be used, if desired together with anionic emulsifiers, in the emulsion polymerization of vinyl esters. Suitable vinyl esters are vinyl acetate, vinyl propionate, vinyl-2-hexyl hexanate and also higher esters of vinyl alcohol. The emulsifiers are also suitable for use in the polymerization of vinyl halides, preferably vinyl chloride or vinylidene chloride.

The emulsifiers or emulsifier mixtures can also be used in the copolymerization of at least one of the above-mentioned monomers with other, optionally partially water-soluble monomers. Thus, they are suitable for use in the copolymerization of ethylenically unsaturated monomers with acrylonitrile, methacrylonitrile, maleates or fumarates, for example di-n-butyl maleate or monobutyl maleate.

Finally, the emulsifiers or emulsifier mixtures are also suitable for use in the emulsion polymerization of mixtures of different monomers, for example mixtures of acrylates with styrene, ethylene with vinyl acetate or vinyl chloride with vinyl acetate and mixtures of vinyl acetate with long-chain vinyl esters, for example versatic acid vinyl ester.

Also within the scope of the invention, the emulsifiers are used in the copolymerization of ethylenically unsaturated, water-insoluble monomers with dissociable, water-soluble monomers, the dissociable, water-soluble monomers making up less than 40% by weight and preferably from 0.5 to 15% by weight of the monomer total.

Suitable water-soluble, dissociable monomers are acrylic acid, methacrylic acid, itaconic acid, maleic acid, fumaric acid, semiesters of maleic acid or fumaric acids, crotonic acid, vinyl sulfonic acid, vinyl phosphonic acid and/or 2-acrylamino-2-methylpropane sulfonic acid. The acids are preferably used in the form of salts, for example alkali metal salts or ammonium salts. Other suitable comonomers are basic esters of acrylic and/or methacrylic acid, for example dimethylaminoethyl methacrylate.

Where the alkyl glycosides are used in accordance with the invention, the preferred ratio of monomers to water is from 1:3 to 1:1 parts by weight. Standard auxiliaries may be used together with the emulsifiers in emulsion polymerization processes. Such auxiliaries include, for example, polymerization initiators and/or accelerators, such as for example potassium or ammonium persulfate, hydrogen peroxide, reducing agents, such as salts of sulfurous acid or of dithionic acid, transition metal compounds and the like. By virtue of the comparatively low stability of the alkyl glycosides at pH values above 7, it is preferred to use buffers, such as sodium hydrogen carbonate or sodium pyrophosphate, ammonium acetate or sodium acetate as further auxiliaries.

It is also possible to use molecular weight regulators such as, for example, organic sulfur compounds, including mercaptoethanol, thioglycolic acid or thioglycolic acid esters with polyhydric alcohols, such as ethylene glycol or glycerol.

With the emulsifiers suitable for use in accordance with the invention, the emulsion polymerization can be carried out at the usual temperatures, for example at temperatures in the range of from 0 to 120° C. and preferably at temperatures in the range of from 40 to 100° C. and under normal pressure or, in the case of gaseous monomers, even under elevated pressure. The various methods of addition known by those skilled in the art of polymerization can be used. Thus, an emulsion can be prepared in the reaction vessel and then polymerized or, if desired, the monomers, auxiliaries or even more emulsion can be added continuously or in batches during the reaction.

As shown in the following Examples, which are not given for purposes of limitation, low-coagulate, stable dispersions are obtained by means of alkyl glycosides. Apart from sorbitan esters, which in their non-ethoxylated state are not suitable for use as polymerization emulsifiers, the alkyl glycosides represent for the first time a class of nonionic polymerization emulsifiers which are not derived from ethylene oxide. Accordingly, the invention provides for the commercially important field of emulsion polymerization products having a range of outstanding properties as an alternative to the ethylene oxide adducts which have hitherto dominated that field.

EXAMPLE 1

Polymerization was carried out in a closed, heatable 2-liter surface-ground reactor equipped with a V4A anchor stirrer, a dropping funnel, a reflux condenser and a 2-liter preliminary vessel equipped with a paddle stirrer. The following components were introduced into the reactor:

195.64 parts by weight of fully deionized water 3.50 parts by weight of $C_{12}$–$C_{14}$ fatty alcohol ether sulfate (degree of ethyoxylation 4); 100 % active substance 0.24 part by weight of potassium peroxydisulfate 0.5 part by weight of sodium hydrogen carbonate The reactor was purged with nitrogen for 20 minutes and then heated to 75° C. The following emulsion was prepared in the preliminary vessel:

246.9 parts by weight of fully deionized water 1.5 parts by weight of $C_{12}$–$C_{14}$ fatty alcohol ether sulfate (degree of ethoxylation 4)

5.00 parts by weight of nonionic emulsifier*

1.9 parts by weight of peroxodisulfate 225.4 parts by weight of 2-ethylhexyl acrylate 254.8 parts by weight of methyl methacrylate 9.8 parts by weight of methacrylic acid A solution of 0.24 part by weight of potassium peroxydisulfate and 4.56 parts by weight of fully deionized water was prepared in the dropping funnel.

Introduction of the pre-emulsion into the reaction vessel was commenced at a temperature of 75° C., the pre-emulsion being added over a period of about 2 hours during which the exothermic reaction was maintained. The internal reactor temperature was 78 to 82° C. The solution of 0.24 part by weight of potassium peroxydisulfate in 4.56 parts by weight of fully deionized water prepared in the dropping funnel was then added for post-initiation. To that end, the temperature was kept at 85 to 90° C. for 60 minutes. After cooling to 30° C., the polymerization mixture was neutralized with a solution of 5 parts by weight of sodium hydrogen carbonate in 45 parts by weight of fully deionized water.

*The following nonionic emulsifiers were used:

Example 1a

Alkyl glycoside based on a fatty alcohol of coconut oil fatty acid and glucose containing 2.2 glucose units per mole of fatty aclohol (statistical average).

Example 1b

Reaction product of nonylphenol with 20 moles of ethylene oxide.

The properties of the two dispersions are shown in the following Table.

TABLE

| | Example 1a invention | Example 1b comparison |
|---|---|---|
| Dry residue after polymerization (%) | | |
| Theoretical | 50.0 | 50.8 |
| Practical | 50.8 | 50.1 |
| Particle size (in nm) | 107 | 152 |
| Viscosity (mPa.s) (Brookfield, spindle 2, 20 r.p.m.) | 400 | 100 |
| Film assessment | clear, colorless, finely fissured | |
| Film assessment after storage in water for | | |
| 1 hour | 0 | 0 |
| 2 hours | 0 | 0 |
| 3 hours | 1 | 1 |
| 4 hours | 1 | 1 |
| 5 hours | 1 | 1 |
| 6 hours | 1 | 1 |
| 24 hours | 2 | 2 |
| Coagulate content (%) | <0.05 | 0.2 |

EXAMPLE 2

Vinyl acetate-vinyl ester copolymers were produced in the same way by emulsion polymerization.

Vinyl acetate-vinyl ester copolymer

| Solution 1 | a | b | c | d | e | f |
|---|---|---|---|---|---|---|
| | (quantities in parts by weight) | | | | | |
| Dist. water | 189.8 | 189.8 | 189.0 | 189.0 | 189.8 | 189.0 |
| Potassium peroxodisulfate | 0.5 | 0.5 | 0.5 | 0.5 | 0.5 | 0.5 |
| Borax | 0.2 | 0.2 | 0.2 | 0.2 | 0.2 | 0.2 |
| Anionic emulsifier I | 3.0 | 3.0 | — | — | 3.0 | — |
| Anionic emulsifier II | — | — | 3.8 | 3.8 | — | 3.8 |

Anionic emulsifier I: sulfosuccinic acid semiester of a lauryl alcohol, disodium salt, having a low degree of ethoxylation, active substance content: 42.0%

Anionic emulsifier II according to German Patent Application P 33 39 407.5: mixed emulsifier of a $C_{12}$–$C_{18}$—α-sulfofatty acid methyl ester, sodium salt, and a $C_{12}$–$C_{18}$—α-sulfofatty acid, disodium salt, activesubstance content 33.0%

Examples 2a–d = according to the invention

Examples 2e, f = Comparison Examples

| | a | b | c | d | e | f |
|---|---|---|---|---|---|---|
| | (quantities in parts by weight) | | | | | |
| Solution 2 | | | | | | |
| Dist. water | 281.2 | 280.9 | 280.6 | 280.3 | 286.3 | 285.7 |
| Anionic emulsifier I | 1.9 | 1.9 | — | — | 1.9 | — |
| Anionic emulsifier II | — | — | 2.5 | 2.5 | — | 2.5 |
| Nonionic emulsifier (type) | 17.1 (A) | 17.4 (B) | 17.1 (A) | 17.4 (B) | 12.0 (C) | 12.0 (C) |
| Potassium peroxodisulfate | 1.9 | 1.9 | 1.9 | 1.9 | 1.9 | 1.9 |
| Borax | 2.1 | 2.1 | 2.1 | 2.1 | 2.1 | 2.1 |
| Solution 3 | | | | | | |
| Vinyl acetate | 330.1 | 330.1 | 330.1 | 330.1 | 330.1 | 330.1 |
| Versatic acid vinyl ester (Veova 10, Shell) | 143.5 | 143.5 | 143.5 | 143.5 | 143.5 | 143.5 |
| Acrylic acid | 4.8 | 4.8 | 4.8 | 4.8 | 4.8 | 4.8 |
| Ammonium carbonate (10 percent) | 23.9 | 23.9 | 23.9 | 23.9 | 23.9 | 23.9 |
| Total | 1000.0 | 1000.0 | 1000.0 | 1000.0 | 1000.0 | 1000.0 |
| Coagulate content | 0.1 | <0.1 | 0.1 | <0.1 | 0.5 | <0.1 |

Nonionic emulsifier (A) = reaction product of 2.6 moles of $C_8$–$C_{10}$ fatty alcohol with 1 mole of glucose, degree of oligomerization 1.8

Nonionic emulsifier (B) = reaction product of 3 moles of $C_{12}$–$C_{14}$ coconut oil fatty alcohol with 1 mole of glucose, degree of oligomerization 2.2

Nonionic emulsifier (C) = nonylphenol + 15 EO

Apparatus

See Example 1

Procedure

The components of solution 1 are initially introduced into the reaction vessel and are then purged with nitrogen and heated to 80° C. During the heating phase, a pre-emulsion is prepared in the preliminary vessel by adding monomer solution 3 to the emulsifier-containing aqueous phase, solution 2, with vigorous stirring. The pH-value of the pre-emulsion is adjusted to 3.8–4.0. When the internal reactor temperature reaches 80° C., introduction of the monomer pre-emulsion is commenced and lasts from 2 to 2.5 hours. On completion of the addition, the temperature of the reaction mixture is kept at 80° C. for another 2 hours. The dispersion is cooled and filtered and the pH-value adjusted to 7.0–7.5 by the addition fo 23.9 g of a 10% ammonium carbonate solution.

The properties of the polymer dispersions shown in Example 2 are shown below:

| | a | b | c | d | e | f |
|---|---|---|---|---|---|---|
| Dry residue (theoretical 50%) | 49.3% | 49.3% | 49.0% | 49.4% | 49.2% | 49.4% |
| Particle size (nm) | 186 | 166 | 175 | 168 | 188 | 160 |
| Dispersity | 0–3 | 0–3 | 0–2 | 0–2 | 0–3 | 3–5 |
| Viscosity (mPa.s) (Brookfield, spindle 1, 20° C.) | 63 | 100 | 68 | 103 | 83 | 88 |

Test methods

1. Coagulate content after preparation

The prepared dispersion is poured through a tared Schwegmann Perlon filter bag having a mesh width of 80 microns. The filter bag together with any coagulate present is dried for 24 hours at 105° C. and the coagulate determined by differential weighing.

2. Dry substance content

Dry residue determinations using an apparatus of the Sartorius 709301 type. The solids content is determined at stage 7 (drying time 20 minutes). The weighed quantity amounts to approximately 5 g.

3. Determination of the average particle size range by automatic measurement using a Coulter Nano-Sizer The measured values are determined in nm by the Nano-Sizer. In addition to measuring the average particle size, the Nano-Sizer provides information on the polydispersity of a dispersion.

The polydispersity of a dispersion is based on its particle size distribution. Particle size distribution is classified on a numerical scale of 0 to 9 in which the value 0–1 means exclusively monodisperse and the value 8–9 exclusively polydisperse.

4. Viscosity

Viscosity is measured at 25° C. using a Brookfield RVT viscosimeter.

5. Film assessment

A wet film is drawn on a specimen holder (76×26 mm, clear glass) using a drawing rule (gap width approx. 1 mm). The film is dried at room temperature for 48 hours. It is then assessed for transparency, fissuring, flow, etc.

6. Sensitivity to water of dispersion films

The films prepared as described above in 5 are stored in tapwater for 24 hours. They are then assessed on a scale of 0 to 6 at intervals of 1 hour.

0=film clear, unchanged
1=edges slightly clouded (local reductions in the layer thickness of the film at its edges can be caused by running of the dispersions)
2=film slightly clouded as a whole
3=film milky
4=film milky to white
5=film partly destroyed, white
6=film extensively destroyed, white The adhesion of the dispersions to the glass is not taken into account.

What is claimed is:

1. In a process for the emulsion polymerization of ethylenically unsaturated monomers, the improvement comprising using from about 0.5 to about 10% by weight, based on the weight of monomer, of at least one alkyl glycoside of a $C_8$-$C_{22}$ alkanol and a reducing sugar in which one sugar chain having an average of from 1 to 10 sugar residues attached to each other by glycoside bonds is present for each alkyl group.

2. A process in accordance with claim 1 wherein said quantity is from about 0.5 to about 6% by weight, based on the weight of monomer.

3. A process in accordance with claim 1 wherein the at least one alkyl glycoside is an alkyl glycoside having a sugar chain containing from 1.5 to 5 sugar residues for each alkyl group.

4. A process in accordance with claim 1 wherein the at least one alkyl glycoside is an alkyl glycoside of a fatty alcohol mixture and one or both of glucose and maltose.

5. A process in accordance with claim 1 wherein the at least one alkyl glycoside is an alkyl glycoside containing alkyl groups of $C_8$-$C_{14}$ fatty alcohol mixtures.

6. A process in accordance with claim 1 wherein a cationic or anionic emulsifier is also present.

7. A process in accordance with claim 1 wherein a nonionic emulsifier other than the at least one alkyl glycoside is also present.

8. A process in accordance with claim 6 wherein a nonionic emulsifier other than the at least one alkyl glycoside is also present.

9. A process in accordance with claim 6 wherein from about 10 to about 80% by weight, based on the weight of alkyl glycoside, of a cationic or anionic emulsifier is also present.

10. A process in accordance with claim 9 wherein from about 20 to about 50% by weight of a cationic or anionic emulsifier is also present.

11. A process in accordance with claim 6 wherein one or more of the following are present: a sulfocarboxylic acid, an alkyl ester thereof, a fatty alcohol (ether) sulfate, an alkyl phenol (ether) sulfate, an alkyl (aryl) sulfonate, a sulfosuccinic acid (semi)ester, a soap, and an alkyl (phenol) ether phosphate.

12. A process in accordance with claim 1 wherein said monomers are one or more of vinyl esters, vinyl ethers, (meth)acrylates, olefins, diolefins, and unsaturated halogen containing compounds.

* * * * *